United States Patent [19]

Camos et al.

[11] 4,300,373
[45] Nov. 17, 1981

[54] WELL CHRISTMAS TREE GUARD APPARATUS

[76] Inventors: Walter M. Camos, 147 Industrial Pkwy., Lafayette, La. 70508; William L. Doize, P.O. Box 52429, Lafayette, La. 70501

[21] Appl. No.: 7,355

[22] Filed: Jan. 29, 1979

[51] Int. Cl.³ ............................................. F16B 41/00
[52] U.S. Cl. ........................................ 70/232; 70/164; 70/178; 70/DIG. 56; 70/DIG. 57; 166/113; 285/80
[58] Field of Search ................. 70/232, 163, 164, 165, 70/178, 57, DIG. 56, DIG. 57; 166/113; 285/80, 81; 137/377

[56] References Cited

U.S. PATENT DOCUMENTS

| | | | |
|---|---|---|---|
| 122,396 | 1/1872 | McIlhenny | 70/232 |
| 725,290 | 4/1903 | Speer | 70/178 |
| 2,048,424 | 7/1936 | Caldwell | 70/232 |
| 2,641,124 | 6/1953 | Gallagher et al. | 70/232 |

FOREIGN PATENT DOCUMENTS

| | | | |
|---|---|---|---|
| 18085 | 7/1914 | United Kingdom | 70/232 |
| 197709 | 9/1977 | U.S.S.R. | 166/113 |

Primary Examiner—William E. Lyddane
Attorney, Agent, or Firm—Charles C. Garvey, Jr.

[57] ABSTRACT

An oil or gas well Christmas tree guard apparatus provides an annular guard body which is protectively secured about a bolted flanged connection of the well Christmas tree, the guard so placed forming an envelope about the flanged connection and preventing access by a thief to the bolts and thus discouraging removal of the bolts from the bolted connection. The protective guard body thus prevents removal of the Christmas tree from its location at the well head by theft denying access to the bolted connection which flanges the Christmas tree to the remainder of the well. In the preferred embodiment the guard body provides a pair of annular shroud halves which are hingedly connected allowing them to be pivotally moved from an outer position allowing removal from the flanged connection to an inner closed operative position providing an overall annular guard body which is latched into position about the desired bolted connection. The guard body hinge as well as the latch structure can be protectively covered by a connected shroud or housing about the latch structure, or the hinge respectively.

10 Claims, 13 Drawing Figures

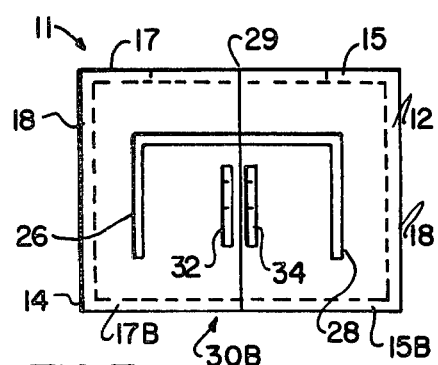
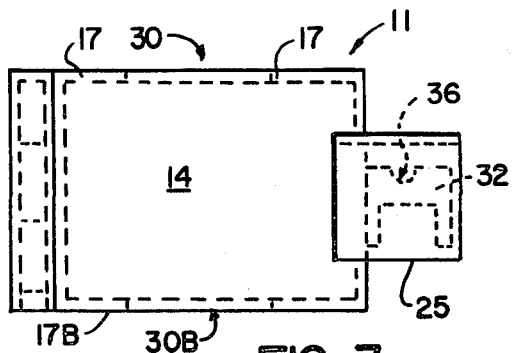
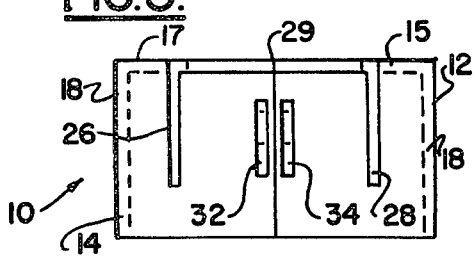
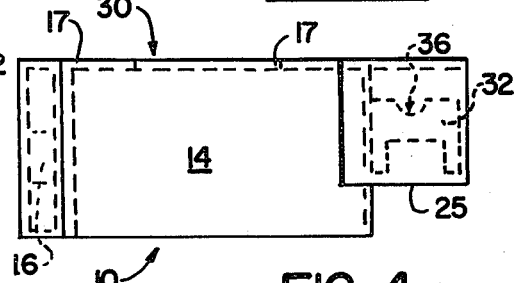
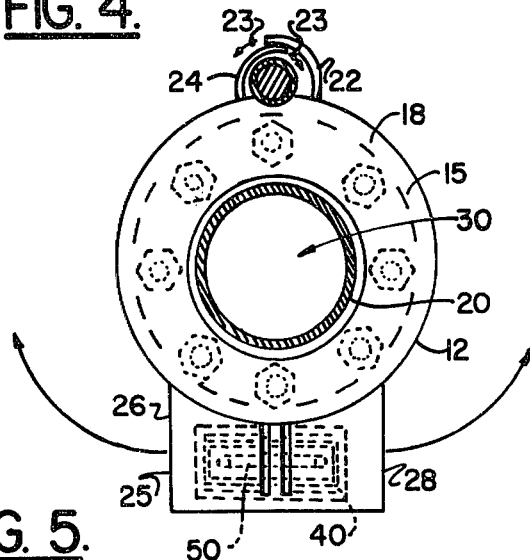
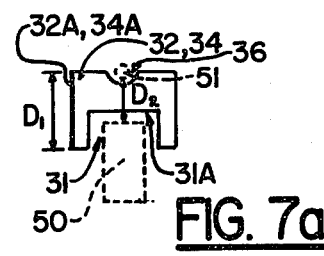
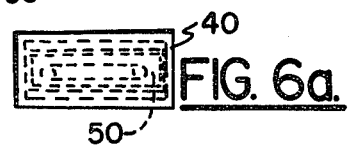
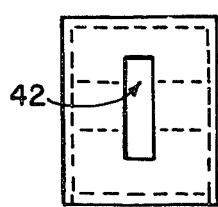
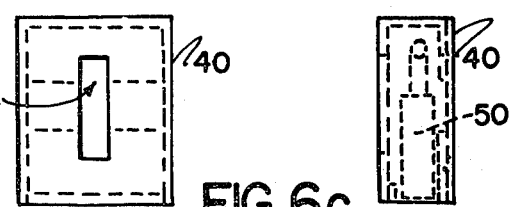
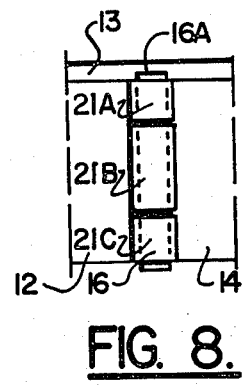

WELL CHRISTMAS TREE GUARD APPARATUS

BACKGROUND OF THE INVENTION

1. Field of the Invention

The present invention relates to anti-theft devices for oil/gas well Christmas tree structures. Even more particularly, the present invention relates to a well Christmas tree guard apparatus which prevents removal of the well Christmas tree from its position at the well head by denying access to the bolted flanged connection which connects the Christmas tree to the remainder of the gas or oil well.

2. General Background and Prior Art

In the oil and gas industry, it is well known that the upper most portion of a well as it leaves the surface of the ground is provided with a structure known in the art as a "Christmas tree." The Christmas tree is generally an assembly of valves, tees, crosses, and other fittings at the well head used to control oil or gas production and to give access to the well tubing. Other fittings such as choke jackets, pressure guages, and the like, can become part of what is known in the art as the "Christmas tree."

This assembly of valves, tees and other fittings which is affixed to the gas well or oil well at the well head is generally attached to the well head by means of a flanged bolted connection.

This merely refers to a connection in which two flanged members (usually circular in shape) are abutted together in a face-to-face relationship, with each flange member having a plurality of peripheral holes which are aligned during assembly to provide a plurality of aligned openings through which bolted connections can be made. These nut and bolt fasteners are placed through the holes and tightened and the connection is perfected by means of a torque wrench or the like so that no leakage occurs. Many times, a master valve is provided on the Christmas tree which controls the flow of gas or oil directly from the well itself. This valve can be closed, preventing any flow of well to the Christmas tree itself. When the master control valve is closed, the Christmas tree can be entirely removed by disassembling one of the bolted connections above the master valve itself on the Christmas tree. Since many oil fields are in remote areas where adequate security is often not possible, and because the bolted connections are easily disassembled, the expensive Christmas tree structure is highly susceptible to theft by persons having some skill in piping, or generally some experience in oil or gas field work.

The thieves could in removing a Christmas tree use a truck equipped with an air compressor and proper power tools. In a remote oil field, the bolted connection could quickly be broken and the Christmas tree hoisted on to the truck and removed with the entire theft being undetected in most cases. The owner of the well who is victimized in such a way not only loses the price of the Christmas tree itself, but is further faced with the cost of installing a new Christmas tree in its proper position, and he loses valuable production of oil or gas while the well itself is shut down.

Other valuable type piping devices such as very expensive valves, are faced similarly with the problem as above described with respect to oil or gas well Christmas trees. Many times, a very expensive control valve could be mounted on a pipeline itself, and could be easily removed by unbolting as is the case with the Christmas tree structure. These valves and contollers are quite expensive, and their removal likewise brings a loss of production or supply of oil or gas flowing with the pipeline.

It is to this general problem that the present invention is directed.

Several locking type devices have been patented which have attempted to solve the problem generally of preventing the removal of a bolt from a nut and thus, securing in a locking manner a bolted connection. None of the prior art devices, however, solves the problems and shortcomings which have plagued the prior art and which problems are solved by the present invention in a simple, inexpensive and effective manner.

Most prior art devices which have been patented relate generally to the problem of providing a locking assembly for a nut or bolt on an individual bolted connection. U.S. Pat. No. 3,295,579 entitled "Lock Bolt" and assigned to Allis Chalmers Manufacturing Company of Milwaukee, Wis. shows such a locking assembly for an individual bolt.

U.S. Pat. No. 3,600,914 entitled "Theft Prevention Device for Tractor Drawn Trailers" shows a prior art type locking device for tractor trailer trucks to prevent their theft.

U.S. Pat. No. 3,930,432 entitled "Fastening Assembly" provides a protective cover over a bolted connection. A cap and base element are provided which can be welded together marginally to prevent access to the bolt head itself.

U.S. Pat. No. 3,696,646 also shows an assembly for locking a single nut or bolt to resist unwanted removal.

These prior art devices unfortunately require that a separate locking mechanism be provided for each individual bolt. This method of locking each individual bolt can become quite expensive and time consuming when attempting to solve the problem presented above and as solved by the present invention. Many bolted flanged connections in piping require as many as twelve (12) or more bolts to complete a bolted connection. The number of bolts is, of course, a function generally of the diameter of the flanged connection.

It is therefore an object of the present invention to provide a guard apparatus having an overall structure which protectively encapsulates an entire bolted connection portion of a piping system denying access to the bolts in the bolted connection.

It is another object of the present invention to provide and oil/gas well Christmas tree guard apparatus having an overall structure which protectively encapsulates an entire bolted connection portion of an oil well Christmas tree apparatus denying access to the bolts in the bolted connection.

It is a further object of the present invention to provide a Christmas tree guard apparatus which is simple, economical, and easy to construct.

It is another object of the present invention to provide a Christmas tree guard apparatus which provides a pair of hingedly connected guard halves which can assemble and disassemble for quick placement or removal from a selected Christmas tree flanged connection.

It is another object of the present invention to provide a Christmas tree guard apparatus wherein the latching and hinge portions of the guard apparatus are themselves protectively covered by encasing protective shrouds or housings, thus discouraging disassembly of the guard by vandalism.

A feature of the present invention is that it will substantially encapsulate and cover all of the bolt and nut members of a flanged piping connection at for example, an oil/gas well Christmas tree.

Another feature of the present invention is that it provides a guard apparatus which is difficult to disassemble, and discourages removal of itself by vandalism from an oil or gas well Christmas tree apparatus and thus, discourages or prevents theft of the well Christmas tree itself.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 3 is a front view of the preferred embodiment of the apparatus of the present invention;

FIG. 3A is a side view of the preferred embodiment of the apparatus of the present invention;

FIG. 4 is a front view of an alternate construction of the apparatus of the present invention;

FIG. 4A is a side view of an alternative construction of the preferred embodiment of the apparatus of the present invention;

FIG. 5 is a top view of the embodiment shown in FIGS. 3-4A;

FIG. 6A-6C are top and front views respectively of the lock housing portion of the embodiment shown in FIGS. 3-5;

FIGS. 7A and 7B are side and front views respectively of a hinge member portion of the embodiments shown in FIGS. 3-5.

FIG. 8 is a partial front view of the hinge portion of the preferred embodiment of the apparatus of the present invention.

DETAILED DESCRIPTION OF THE PREFERRED EMBODIMENT

Figures 1, 2:
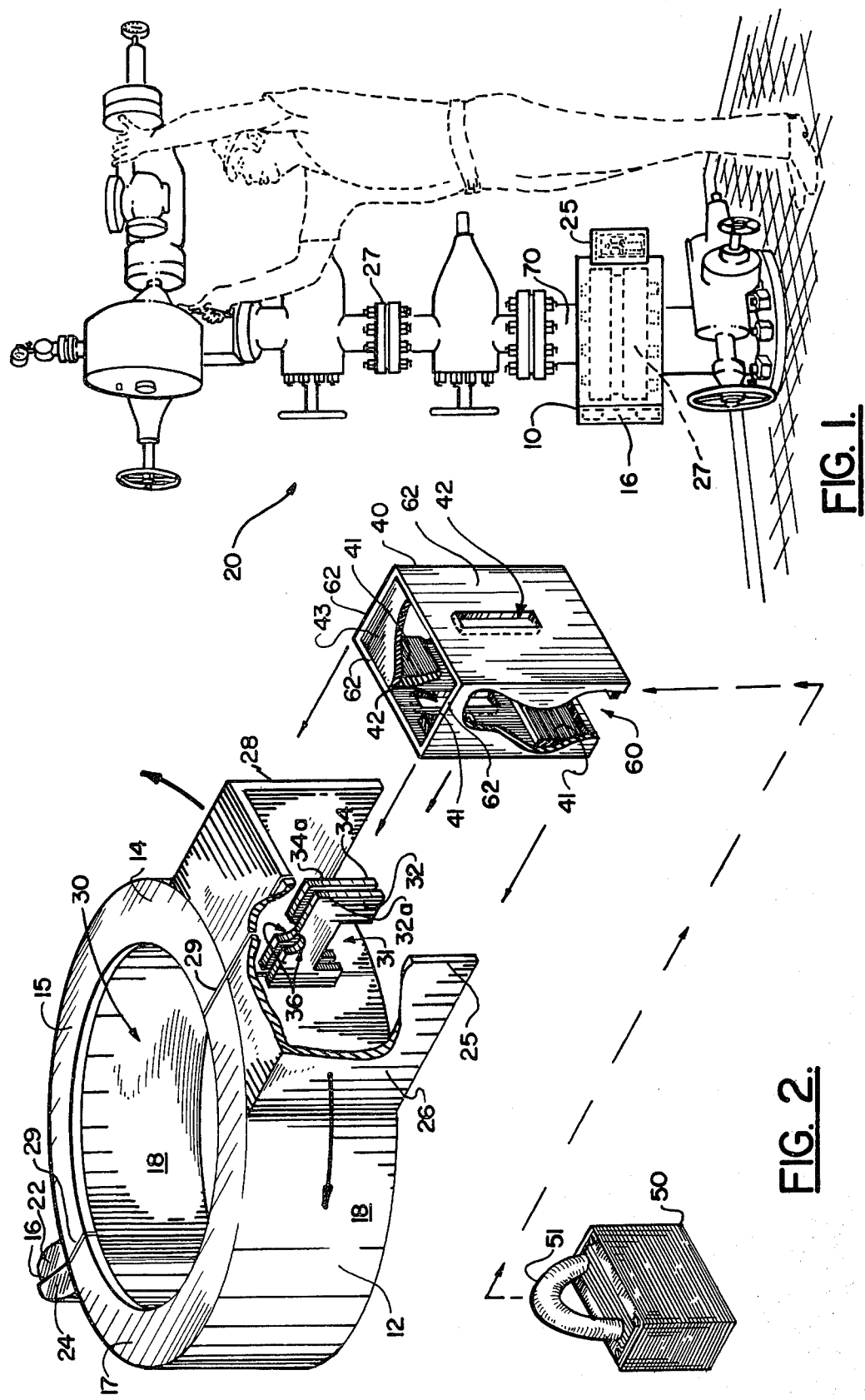
FIG. 1 is a perspective view of a typical oil/gas Christmas tree apparatus showing the preferred embodiment of the apparatus of the present invention affixed thereto at a bolted connection.
FIG. 2 is a perspective partially cut-away view of the preferred embodiment of the apparatus of the present invention.

In FIG. 1, there can be seen a perspective view of a typical oil or gas well Christmas tree 20. Christmas tree 20 is known in the art generally as an assembly of valves, tees, crosses, and other fittings at the well head, used to control oil or gas production and to give access to the well tubing. As can further be seen by an inspection of FIG. 1, bolted connections 27 are provided on Christmas tree 20 which bolted connections 27 are generally flanged connections and provide points for the disassembly of Christmas tree 20 as is known in the art.

In FIG. 1, Christmas tree 20 is provided at one bolted flanged connection 27 with the Christmas tree guard apparatus 10 of the present invention attached thereto with the bolted connection 27 being shown in phantom lines.

FIGS. 2 through 7 illustrate more particularly the structure of the preferred embodiment of the apparatus of the present invention designated generally in FIGS. 2 and 3 by the numeral 10.

Guard 10 is comprised generally of a pair of guard shroud halves 12, 14. Shroud halves 12, 14 are generally circular, having annular peripheral side walls 18 and each having a semi-circular shroud top portion 15, 17 respectively.

A view of FIG. 2 will reveal that each shroud top portion 15, 17 is generally semi-circular, but having an inner cut out portion to provide a circular opening 30 in guard body 12 when the two (2) shroud halves 12, 14 are assembled, as is illustrated in FIG. 2. It should be understood that this "assembled" or "closed" position is the position which guard 10 will assume when its in its protective, closed and if desired locked position about a desired flanged, bolted connection, 27. This operative closed position is also seen in FIG. 1.

Shroud halves 12, 14 will move pivotally apart (See arrows, FIG. 2). As shroud halves 12, 14 move apart in a such a fashion, guard assembly 10 can be removed or placed upon the desired bolted connection with the latches 32, 34 thereafter being secured by lock housing 40 and padlock 50, as will be described more fully hereinafter. Note however at this time, that lock housing 40 slips over latches 32, 34 with latches 32, 34 penetrating openings 42 which are sized to correspond with the front faces 32a, 34a (and cross sectional area) of latches 32, 34. Before lock housing 40 is so positioned, a padlock 50 can be inserted through opening 60 and during insertion of housing 40 to latches 32, 34 hung on lock carriage grooves 36 of latches 32, 34. Shims 41 insure a tight fit of lock 50 within housing 40. Top 43 deters vandalism to cut lock 50 once affixed.

Hinge structure 16 is best shown in FIG. 8. Hinge 16 can be a conventional type hinge structure having an inner hinge pin 16a and a plurality of outer hinge collars 21a-21c. It will be understood that two (2) hinge collars 21a and 21c will be affixed to one of the shroud halves 12 with the other hinge collar 21b affixed to the other shroud half 14. Thus, a pivotal hinge connection will be formed as is desirable.

A pair of hinge covers 22, 24 (See FIG. 5) will protectively cover hinge 16 to prevent or at least deter the removal of guard structure 10 by a disassembly at hinge 16 by vandalism or other destruction. Hinge covers 22, 24 provide an inner hinge cover 24 and an outer hinge cover 22 which arcuatly correspond to one another and pivotally move with each shroud half 12, 14 to which is attached (See arrows 23, FIG. 5).

The structure of guard 10 is further shown in FIGS. 3-6. A pair of latches 32, 34 are attached to shroud halves 12, 14 respectively at the opposite portion from hinge structure 16. Latches 32, 34 are each generally affixed by welding or like means to its corresponding shroud half 12, 14 respectively (See FIGS. 2 and 3).

The outwardly extending portion of each latch member 32, 34 abuts in a face-to-face relationship, with each providing an upper lock carriage groove 36 which can be for example a semi-circular groove cut in the upper surface portion of each latch member 32, 34, and sized to hold the upper or shackle 51 portion of padlock 50.

In FIG. 7A there can be seen latch 32 with its lock carriage groove 36 and a lock 50 attached thereto shown in phantom lines. Each latch 32, 34 further provides an underside latch recess 31 which provides a space for the lower body portion of lock 50.

Latches 32, 34 carrying padlock 50 at lock carriage 36 will thus be prevented from lateral movement to an opened position as is illustrated by the arrows of FIG. 2.

In FIGS. 6A-6C, there is seen a lock housing 40 having a pair of generally rectangular openings 42. Lock housing 40 slides onto and fits over the assembled latches 32, 34 when they are in their closed position. Lock housing 40 can be seen in phantom lines as shown in FIG. 5.

From the above, one can see that a typical conventional padlock 50 will be placed into the space 60 provided within the peripheral aide walls 62 of housing 40 before its assembly with latches 32, 34. In FIGS. 2 and 5, there can be seen four (4) peripheral side walls 62 which are integrally formed providing an inner lock recess 60. A lower opening is provided to lock housing 40 allowing a conventional padlock 50 to be added to the padlock space 60 before placement of housing 40 over latches 32, 34.

With lock shackle 51 resting on lock carriage 36 and completely surrounded by lock housing 40 in a protective manner, the padlock shackle 51 is closed, thereafter performing its locking function by preventing the lateral movement of latches 32, 34.

Note from an inspection of FIGS. 2 and 6a-6c that a plurality of shim members 41 can be used to fit padlock 50 to housing 40 with minimum tolerances. Preferably, shims 41 would be utilized to insure a very tight fit of padlock 50 within the innerspace 60 of housing 40. Such a shimming would further discourage vandalism by the placement of any prying tools into the spacers between lock 50 and walls 62 of housing 40.

An inspection of FIG. 7A will illustrate how padlock 50 and its shackle 51 are affixed to latches 32, 24 to prevent the removal of housing 40 therefrom. Note that the front face 32a, 34a is of a height of D1. However, a distance D2 is provided and sized to correspond with a selected padlock 50 with D2 being the distance between the padlock 50 and the upper portion of shackle 50 when padlock 50 is locked.

D2 further represents a minimal distance between lock carriage 36 and recess 31. It will be seen from the above, that a removal of lock 50 will not be possible once the shackle 51 portion has been secured since the distance D2 between the shackle 51 and the lock 50 will be smaller than distance D1. Distance D1 could be provided of a distance lesser than the distance between lock 50 and shackle 51 when the lock is opened, allowing removal of the lock 50 from latches 32, 34 after opening of lock 50 by key.

From the above, it will be seen that each guard apparatus 10 must be supplied by a manufacturer with a lock which corresponds to the above specifications, namely, the lock when opened must have a clearance which allows it to be placed over the front face 32a, 34a of latches 32, 34, the distance D1 being illustrated in FIG. 7A. Further, the lock must have a clearance which is approximately equal to distance D2 namely the distance between lock carriage 36 and the innerface 31a of recess 31. Generally, the padlock will be inserted into space 60 of housing 40 before the insertion of housing 40 and the enclosed lock 50 over latches 32, 34. During this insertion, shackle 51 of lock 50 will be opened. Once housing 40 and the enclosed lock 50 are applied to latch 34, 36 padlock 50 will be secured (See FIGS. 1 and 7A) by closing shackle 51. In this position the padlock 50 can be unlocked only by a person having the key thereto. Recess 31 prevents removal of lock housing 40 after the padlock is closed. The entire assembly of lock 50 and housing 40 will be easily slipped off latches 32, 34 when a key unlocks padlock 50.

The entire assembly of latches 32, 34 and lock housing 40 with its enclosed padlock 50 is further protectively covered by a latch housing 25 which is generally rectangular as is seen in FIG. 2 and 3. Latch housing 25 is provided with two (2) generally ell shaped members 26, 28 which members correspond to one another being of substantially identical shape and size and mate at surface 29 when halves 12, 14 are assembled in the closed position (See FIG. 3).

FIG. 1 illustrates the guard apparatus 10 of the present invention in its functional position about a typical flanged bolted connection 27. In FIG. 1, there can be seen guard 10, latch housing 25, hinge 16, and padlock 50.

The opening 30 in guard 10 once assembled allows the passage of Christmas tree 20 therethrough as is illustrated in FIGS. 1 and 2. In FIG. 2, there can be seen the affixation of guard 10 to a flanged, bolted connection 27, with opening 30 allowing a more narrow portion of the Christmas tree 20 to pass therethrough. This narrow portion is designated by the numeral 70 in FIG. 2.

FIGS. 3 and 3A illustrate an alternative construction of the preferred embodiment of the apparatus of the present invention designated generally by the numeral 11. Guard apparatus 11 will be substantially identical to the embodiment illustrate in FIGS. 4 and 4A, but there are also bottom plate 15B, 17B provided to each guard half 12, 14. An opening 30B similar to opening 30 in FIG. 5 allows a valve or pipe to pass therethrough. The embodiment illustrated in FIGS. 3 and 3A and designated by the numeral 11 will be utilized on flanged connections where the guard could be moved in either direction away from the flanged connection 27. The embodiment shown in FIGS. 4 and 4A as was discussed with respect to the preferred embodiment will be utilized on flanged connections where movement of the guard apparatus in only possible in one direction. Such an example of the application of guard apparatus 11 would be in the case of a simple bolted flanged connection of a pipeline. If the embodiment shown in FIGS. 4 and 4A were utilized, the entire guard apparatus 10 could be merely slid off the flanged connection in the direction coincident with the bore of the pipeline. However, if the flanged connection were immediately adjacent a huge valve body for example, movement away from the flanged connection 27 could not be accomplished. In such a case, the embodiment shown in FIGS. 4 and 4A could be used.

Guards 10, 11 could be manufactured of any suitable preferably structural material, such as steel or the like. The construction would be generally welded for strength. A suitably thickened metal should be used such as one quarter inch ($\frac{1}{4}$") or one half inch ($\frac{1}{2}$") plate steel. If used in corrosive environments, such as offshore, the device could be manufactured of stainless steel, or could be painted with a suitable protective anti-corrosive coating.

The guard apparatus of the present invention as above described would thus provide a suitable structural anti-theft covering to the bolted connection of a Christmas tree 20 which bolted connection is highly susceptible to disassembly thus allowing the theft of the entire Christmas tree or like valuable piping implement or fitting itself.

Guard 10 would be a significant deterrent to an individual attempting to steal Christmas tree 20 or like expensive fitting. When so used as is taught with the detailed description of the preferred embodiment, guard 10 will only be removed by using time consuming and destructive means, such as a welding torch to cut through the steel. This would present a significant amount of equipment, as well as, a significant amount of time to the thief and thus discourage his theft of the device.

The guard 10 taught by the present invention would be easily fabricated in a welding shop, and could be easily fabricated of steel as above described.

Lock housing 40, latches 32, 32 and lock carriage 36 provide a combination locking arrangement to guard 10 which allows a relatively inexpensive padlock 50 to form the finally locking function once the device is constructed within the teaching of the present invention.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An oil/gas well Christmas tree guard apparatus comprising:
   a. a shroud comprising a pair of shroud halves, each of said shroud halves having a sidewall portion and an attached top portion;
   b. hinge means for pivotally attaching said pair of shroud halves, said shroud halves being pivotally movable from a closed protection position about a flanged bolted connection of the Christmas tree to an open position for removal from the flanged bolted connection portion of the Christmas tree, said shroud halves forming a protective enclosure about the flanged bolted connection in said closed position, so as to prevent removal of the bolts therefrom and further forming, in said closed position, a central opening in said top portion of said shroud through which opening a portion of the Christmas tree at the bolted connection can pass;
   c. a pair of latches securing said pair of shroud halves in said closed position, at least one of said latches being provided with a lock carriage, a conventional padlock being affixable to said latches at said lock carriage, and so secured, preventing a release of said latches from said closed position; and
   d. a lock housing at least partially surrounding during locked operation said lock carriage and an affixed padlock, said lock housing fitting about said carriage and the padlock while affixed to said lock carriage; yet being removable from said lock carriage with the padlock.

2. The guard apparatus of claim 1 wherein said lock housing is a generally rectangular housing defining an inner padlock space and having a plurality of connected peripheral walls with an opening communicating with said padlock space and there is a central latch opening through said housing penetrating at least one of said walls and being receptive of said latches when closed, and said lock carriage occupies a portion of the inner padlock space of said lock housing when a padlock secures said latches and said pair of shroud halves are in said closed position.

3. The guard apparatus of claim 2 wherein said lock carriage is a groove cut on the upper surface portion of at least one of said latches.

4. The guard apparatus of claim 1 wherein said latches each have a lower recess receptive of a padlock and a lock carriage recess receptive of a padlock shackle.

5. A flanged connection guard apparatus comprising:
   a. a protective shroud comprising a pair of shroud halves, said shroud halves being hingedly connected and movable between open and closed positions, and providing a space therebetween for the placement of a bolted connection within the shroud halves when the shroud halves are assembled in the closed position;
   b. a lock carriage formed on said pair of shroud halves when said pair of shroud halves are assembled together in said closed position, said lock carriage providing a place for the attachment of a conventional padlock thereto, with the placement of the conventional padlock on the lock carriage thereafter preventing disassembly of said shroud halves;
   c. a lock housing at least partially surrounding said lock carriage and a padlock affixed to the lock carriage during locked closed operation, the lock housing being secured to the shroud by the lock carriage and the affixed padlock during such closed operation.

6. The guard apparatus of claim 5 wherein said lock housing is separable from said lock carriage upon removal of a padlock affixed to the lock carriage.

7. The guard apparatus of claim 5 further comprising a pair of latches secured respectively to said pair of shroud halves, said latches being adjacent when said shroud halves are moved to a closed position.

8. The guard apparatus of claim 7 wherein said latches provide thereon, said lock carriage.

9. The guard apparatus of claim 6 wherein said lock carriage is formed by a pair of latches provided respectively on said pair of shroud halves, and said latches each provide a lock carriage thereon for the affixation to said pair of latches, and there is further provided a padlock means for preventing disassembly of said latches.

10. The guard apparatus of claim 9 wherein the latch housing surrounds the pair of latches and said padlock means during operation.

* * * * *